US012647786B2

(12) United States Patent
Ross et al.

(10) Patent No.: US 12,647,786 B2
(45) Date of Patent: Jun. 2, 2026

(54) METHOD FOR OPERATING A SECURITY SYSTEM

(71) Applicant: Robert Bosch GmbH, Stuttgart (DE)

(72) Inventors: Hans-Leo Ross, Lorsch (DE); Kurt Eckert, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 397 days.

(21) Appl. No.: 18/005,689

(22) PCT Filed: Oct. 20, 2021

(86) PCT No.: PCT/EP2021/079039
§ 371 (c)(1),
(2) Date: Jan. 17, 2023

(87) PCT Pub. No.: WO2022/090012
PCT Pub. Date: May 5, 2022

(65) Prior Publication Data
US 2023/0300609 A1 Sep. 21, 2023

(30) Foreign Application Priority Data
Oct. 28, 2020 (DE) ..................... 10 2020 213 522.3

(51) Int. Cl.
*H04W 12/08* (2021.01)
*H04L 67/12* (2022.01)
(Continued)

(52) U.S. Cl.
CPC ............. *H04W 12/08* (2013.01); *H04L 67/12* (2013.01); *H04W 4/40* (2018.02); *H04W 12/033* (2021.01); *H04W 8/005* (2013.01); *H04W 84/005* (2013.01)

(58) Field of Classification Search
CPC ..... H04W 12/08; H04W 4/40; H04W 12/033; H04W 8/005; H04W 84/005; H04L 67/12
See application file for complete search history.

(56) References Cited

U.S. PATENT DOCUMENTS 10,267,652 B1 * 4/2019 Magley ................. H04W 76/11
2005/0005009 A1 * 1/2005 Takahashi ............... H04L 67/12
709/227

(Continued)

FOREIGN PATENT DOCUMENTS

DE 10048863 A1 4/2002
DE 102015205607 A1 9/2016
(Continued)

OTHER PUBLICATIONS

Inernational Search Report for PCT/EP2021/079039, Issued Jan. 28, 2022.

*Primary Examiner* — Cheng-Feng Huang
(74) *Attorney, Agent, or Firm* — NORTON ROSE FULBRIGHT US LLP

(57) ABSTRACT

A method for operating a security system. The method includes: providing payload data and monitoring data on a backend device; transmitting the payload data via a first channel and transmitting the monitoring data via a second channel of an air interface to an apparatus device; wherein the payload data are transmitted to the apparatus device only when the monitoring data are cyclically received on the apparatus device.

9 Claims, 5 Drawing Sheets

(51) Int. Cl.
  *H04W 4/40*          (2018.01)
  *H04W 12/033*     (2021.01)
  *H04W 8/00*          (2009.01)
  *H04W 84/00*        (2009.01)

(56)                    References Cited

U.S. PATENT DOCUMENTS

| | | | | |
|---|---|---|---|---|
| 2016/0171494 A1* | 6/2016 | Jiang | .................. | H04L 63/1425 |
| | | | | 705/44 |
| 2017/0078902 A1* | 3/2017 | Matsuo | ................ | H04W 72/02 |
| 2018/0365962 A1* | 12/2018 | Kusakawa | .......... | H04L 12/2809 |
| 2019/0059116 A1* | 2/2019 | Crohas | ............. | H04W 74/0866 |
| 2021/0349773 A1* | 11/2021 | Gusat | ................... | G06F 11/079 |

FOREIGN PATENT DOCUMENTS

| | | | |
|---|---|---|---|
| DE | 102016113499 A1 | 1/2018 |
| DE | 102020001677 A1 | 6/2020 |
| WO | 2017053454 A1 | 3/2017 |

* cited by examiner

METHOD FOR OPERATING A SECURITY SYSTEM

FIELD

The present invention relates to a method for operating a security system. The present invention further relates to a backend device or communication device, e.g., Car-to-Car or Car-to-Infrastructure. The present invention further relates to an apparatus device. The present invention further relates to a security system. The present invention further relates to a computer program product.

BACKGROUND INFORMATION

Conventional automated driving functions are largely based on end-to-end protection of data streams. This applies to both internal computer communication and inter-controller communication, and even to Car-to-X communication. Consequently, this can no longer be implemented for cooperative behavior in digital road traffic networks since this involves communication with constantly changing subscribers, which can only be predicted to a limited extent, and in some cases is based on broadcast or multicast communication. In addition, the number of semantic communication systems (OPC-UA) which deliver a context for a subsequent payload along with a part of a message is constantly growing.

Influences from infrastructure, weather, sudden obstructions on the road, mistakes by other road users, etc., mean that the communication of the new or altered safety scenarios has to be dynamic. In deterministic or semi-deterministic processes that can be implemented, for example, on conventional bus systems (Flexray, CAN, etc.), an unambiguous data flow having known communication end points has to be defined during development. Since, in particular, the traffic situation has to be continuously monitored and the vehicle is repeatedly faced with new combinations of all manner of statuses, events, and effectiveness, it is essential to continuously observe the traffic situation and the other parties (people, drivers, pedestrians, cyclists, passengers, other road users, etc.) on the road. Moreover, said parties behave in very different ways when faced with heterogeneous peripheral conditions, particularly when in stressful situations or in the event of changeable weather conditions. These new insights and the resultant risks have to be made available as information to the vehicle driver or to the systems driving the vehicle. Otherwise, the technical systems for driving the vehicle may not react appropriately to rare and unusual events, and combinations thereof, in the traffic situation. In such scenarios, the aforementioned determinism in relation to data flows and communication subscribers is largely no longer available. This is the case in particular when the communication is based on multicast or broadcast communication.

PCT International Patent Application No. WO 2017/053454 A1 discloses communication network architectures, systems, and methods for connecting to a network of moving things. A request from a mobile access point installed in a vehicle can be received by way of a network interface circuit of one or more pieces of computing equipment. The processing circuit of the one or more pieces of computing equipment may determine properties of a captive portal, which are intended to be presented as a response to the requirement on the basis of the current location of the vehicle and of the mobile access point. A captive portal having the determined properties is then provided as a response to the requirement by the processing circuit by way of the network interface circuit.

SUMMARY

An object of the present invention is to provide an improved method for operating a security system.

According to a first aspect of the present invention, the object may be achieved by a method for operating a security system. According to an example embodiment of the present invention, the method comprises the steps of:

providing data and monitoring data on a backend device;

transmitting the payload data via a first channel and transmitting the monitoring data via a second channel of an air interface to an apparatus device; wherein the payload data are transmitted to the apparatus device only when the monitoring data are cyclically received on the apparatus device in a defined time frame.

In this way, a security system or system that can fulfill defined requirements in relation to functional security is advantageously provided. The monitoring data either are cyclical and a receiver knows that implicitly, or there was a previous item of data that indicated when the next item of data was to be expected. In this way, for example, an availability of an autonomous driving function of an automated vehicle can advantageously be expanded by making autonomous driving available even in difficult traffic scenarios.

Advantageously, said driving function can thus be provided beyond the vehicle at least in part by way of an infrastructure on the route, as a result of which a determinism of a data flow for the automated vehicle is facilitated to a great extent. In this case, the monitoring data form, as it were, a 'heartbeat' of the system that indicates whether the system is still functional via the air interface and is thus able to transmit control data. In addition, the system specifies a time frame in which the current communication function can be guaranteed.

According to a second aspect of the present invention, the object may be achieved by a backend device. According to an example embodiment of the present invention, the backend device comprises:

a control device;

a sending device;

a first data switching device; and a first monitoring module; wherein payload data and monitoring data can be transmitted on independent channels of a radio interface by way of the first data switching device and the first monitoring module.

This monitoring module also checks the technical prerequisites of the sending device that are needed for the relevant data to be successfully transmitted. On the basis of the capabilities, the control device adjusts the sending operation in terms of time within the bounds of the specification.

In the case of the sending module, the correct, timely control of the communication (control flow monitoring) is monitored using the monitoring unit, and the correctness of the content of the payload and the timeliness thereof (data flow monitoring) are also monitored. This measure is thus accordingly likewise implemented on the receiver side. Independence may also be provided by other underlying certificates or keys (CRC, hashes, etc.).

According to a third aspect of the present invention, the object may be achieved by an apparatus device. According to an example embodiment of the present invention, the apparatus device includes:

a receiving device;

a capturing device;

a control device;

a second data switching device; and a second monitoring module; wherein payload data and monitoring data can be received, and/or were received in a timely and punctual manner, on independent channels of a radio interface by way of the second data switching device and the second monitoring module.

According to a fourth aspect of the present invention, the object may be achieved by a security system. According to an example embodiment of the present invention, the security system comprises:

a proposed backend device;

a proposed apparatus device; and a radio interface arranged therebetween; wherein data transmission from the backend device to the apparatus device via the radio interface can be monitored.

According to a fifth aspect of the present invention, the object is achieved by a computer program product comprising program code means configured for carrying out the method according to the present invention when it is run on a proposed security system or is stored on a computer-readable data medium.

Advantageous developments of the method are disclosed herein.

In an advantageous development of the method of the present invention, the payload data are supplied to a publication module of the backend device. In this way, a sequence of the proposed method can be initiated by making available payload data of objects captured by sensors, for example.

In another advantageous development of the method of the present invention, the data are encrypted on the backend device and transmitted via the air interface in an encrypted manner. This advantageously helps to ensure high levels of security in the proposed method; moreover, an item of time information is sent as a component of the information so that the receiving unit can check that the receipt was timely.

In another advantageous development of the method of the present invention, the data are received by a data switching device on the apparatus device and are distributed to registered components of the apparatus device. This helps to ensure that only registered components may receive the intended data, which are received while being monitored via monitoring data. This advantageously also helps to ensure high levels of security in the proposed method.

In another advantageous development of the method of the present invention, the receipt of the monitoring data is cyclically checked by the apparatus device, wherein the apparatus device knows the points in time at which the monitoring data are supposed to be received. This allows the apparatus device to check, in a simple manner, whether monitoring data are received at an intended time, thereby advantageously facilitating determinism in the data transmission.

In another advantageous development of the method of the present invention, in the event that the monitoring data are not received by the apparatus device, an apparatus operated using the apparatus device is placed in a safe state or the function implemented on the basis of the data is adjusted such that the apparatus can continue to be safely operated. In this case, for example, an autonomous vehicle operated using the apparatus may be placed in a safe state, e.g., stopped or parked, or, for example, the maximum permitted speed is reduced accordingly.

The present invention is described in detail below on the basis of several figures in conjunction with further features and advantages. The figures are primarily intended to illustrate the main features to the present invention.

Disclosed method features analogously result from corresponding disclosed apparatus features, and vice versa. In particular, this means that features, technical advantages, and configurations relating to the method result in an analogous manner from corresponding configurations, features, and advantages relating to the individual components of the security system or to the security system itself, and vice versa.

DETAILED DESCRIPTION OF EXAMPLE EMBODIMENTS

Figure 1:
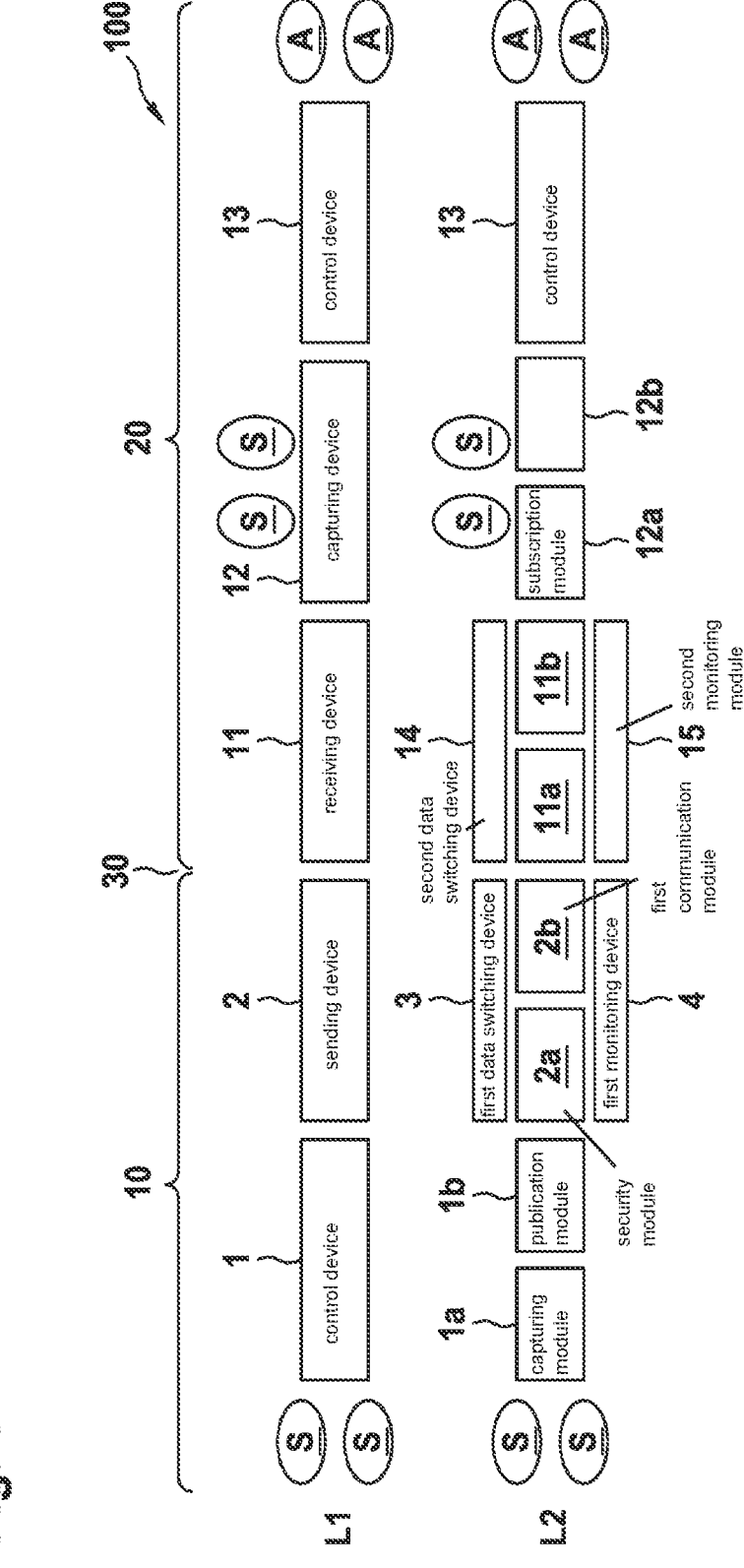
FIG. 1 is a block diagram of a security system according to an example embodiment of the present invention.

In the following, the term 'automated vehicle' is used synonymously for a fully automated vehicle, a partially automated vehicle, a fully autonomous vehicle, and a partially autonomous vehicle.

In the context of the present invention, a 'security system' should be construed as a system that can provide defined requirements in relation to functional security.

In cooperative traffic behavior, any combination of possible road traffic risks should be able to be simultaneously managed by a plurality of systems that are driving in an automated manner. However, conventional E/E and security architectures cannot react to continuous environmental influences and dynamically adjust corresponding measures. The vehicle correctly reacts in the same way to all events, whether sporadic or cyclical. Therefore, in addition to the critical effects from infrastructure or other vehicles, the decision regarding adequate safety measures also has to factor in a context regarding the correct time and correct situation.

Consequently, the safety-critical information and its control sequence flow have to be prioritized accordingly. What is proposed is separating out a data flow from a monitoring data flow. The data flow is optimized in terms of performance requirements; corresponding templates for the protocol structure are applied and coordinated between the sender and each receiver.

Advantageously, a redundant data stream can thus be transferred wirelessly at maximum power via two independent channels. In this case, data content, together with an assigned defined security key, is transmitted in a first path, and monitoring data, which control the transmission of the data, are transmitted in a second path. In principle, this represents a handshake between the control flow monitoring and data flow monitoring via the air interface. However, the case of independent physical paths is only one variant. In a variant, it is also possible that the monitoring data can be transmitted on the same physical channel, although in each case they are logically separated from the payload data.

For the proposed monitored data transmission, a preferred specific embodiment of the proposed method uses the standardized CPM protocol, which provides various templates and formats for safety-relevant objects in their context and their time assignment. However, other suitable data transmission protocols are also possible for the data transmission via the air interface. Constantly transmitting these data volumes in full each time for all scenarios, situations, and degradation scenarios would lead to a huge flood of data. Security modules on a sender side and receiver side thus ensure that correct data are compiled using correct security attributes at the correct time and are provided for communication via the air interface. In addition, these security modules check a security integrity of the transmitted data.

Respective data switching devices arranged on the sender side and receiver side assemble the data in accordance with the relevant situation, the relevant state, etc. and prepare them for communication via the air interface. If this is implemented correctly in consideration of all security requirements, certain security certificates are selected by the security module and provided for protection in the communication.

A final security instance in the form of a monitoring module monitors the overall process and delivers a master security certificate for a particular time period. This is communicated to the receivers in the apparatuses with the highest priority.

This master security certificate also controls the data processing on the receiver side and ensures that the measures initiated on the basis of the transmitted information are in conformity with the data quality and transmission quality. In the scenario as a server in a client-server communication, the data switching device can then provide the necessary data, including the relevant security certificates, to the various clients in the vehicles or also to the various consumers in the vehicle. This master security certificate also ensures the basic functioning for the communication when the data are received correctly and in a timely manner, and acts as the very last shut-off device, which may also be configured to be dynamic or error-tolerant like a window watchdog.

FIG. 1 shows a specific embodiment of a proposed security system 100, by which infrastructure data can be transmitted to an at least partially automated apparatus (e.g., vehicle; not shown). A backend device 10 and an apparatus device 20, which can communicate with one another via an air interface 30 (mobile radio link, WLAN connection, etc.), can be seen. A communication chain from an infrastructure sensor system to a vehicle controlled by the apparatus device 20 is also indicated.

At a first detail level L1 of the backend device 10, a control device 1 and a sending device 2 can be seen. A receiving device 11, a capturing device 12, and a control device 13 for controlling the at least partially automated apparatus can also be seen on the apparatus device 20.

Sensors S are provided for capturing an environment around the at least partially automated apparatus. Actuators A, for example actuators of the vehicle, steering, brakes, etc., are used for operating the at least partially automated apparatus.

At a detail level L2, the aforementioned components can be seen in higher resolution. It can be seen that the control device 1 has a capturing module 1a and a publication module 1b, the capturing module 1a being responsible in particular for data merging and the publication module 1b being responsible in particular for publishing or supplying data on captured objects $O_1 \ldots O_n$. It can also be seen that the backend device 10 has a first data switching device 3 and a first monitoring device 4 ('heartbeat module').

Figure 2:
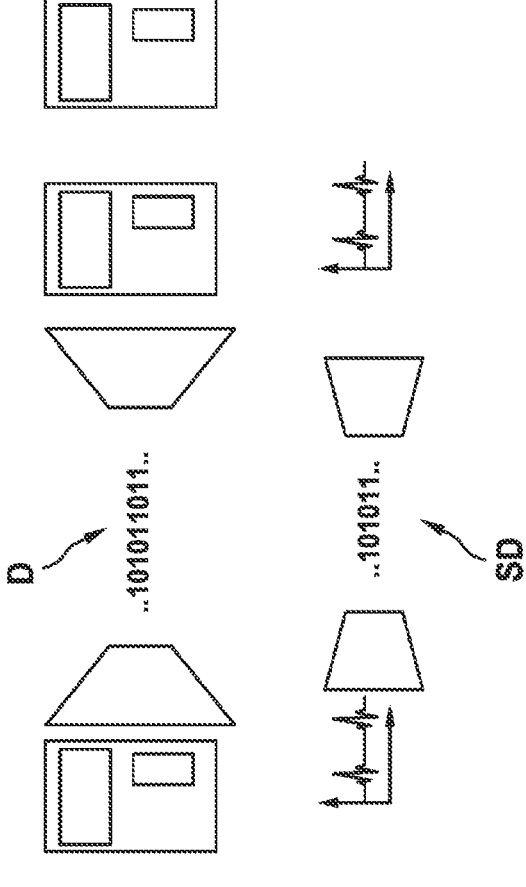
FIG. 2 is a communication diagram of a, information flow between the backend device and the apparatus device, according to an example embodiment of the present invention.
Figure 2:
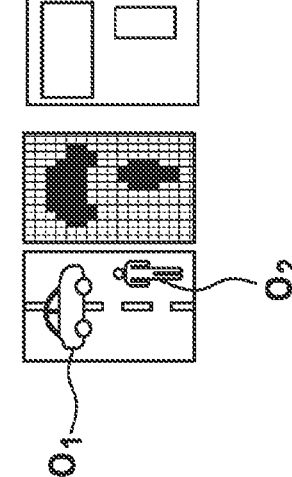

FIG. 2 shows flows of payload data D and monitoring data SD from the backend device 10 to the apparatus device 20, which can be implemented by the security system 100 of FIG. 1. Objects $O_1$, $O_2$ can be seen for example in the form of a vehicle or a person which has been captured using a sensor system S (a camera in a parking lot, a camera on the roadside, etc.) of the backend device 10 and transferred to the apparatus device 20, which controls the apparatus, by way of a data stream via an air interface 30. In the process, the payload data D and the monitoring data SD are transmitted on independent channels of the air interface 30, it being possible to monitor the proper functioning of the air interface 30 using the monitoring data SD.

As a result, this helps to ensure the continuous monitoring of whether the air interface 30 is still functional and thus whether the payload data D can be transferred from the backend device 10 to the apparatus device 20 in an organized manner. In this way, determinism of the data transmission from the backend device 10 to the apparatus device 20 is advantageously improved, as a result of which the apparatus can be efficiently controlled 'externally' at least in part.

Figure 3:
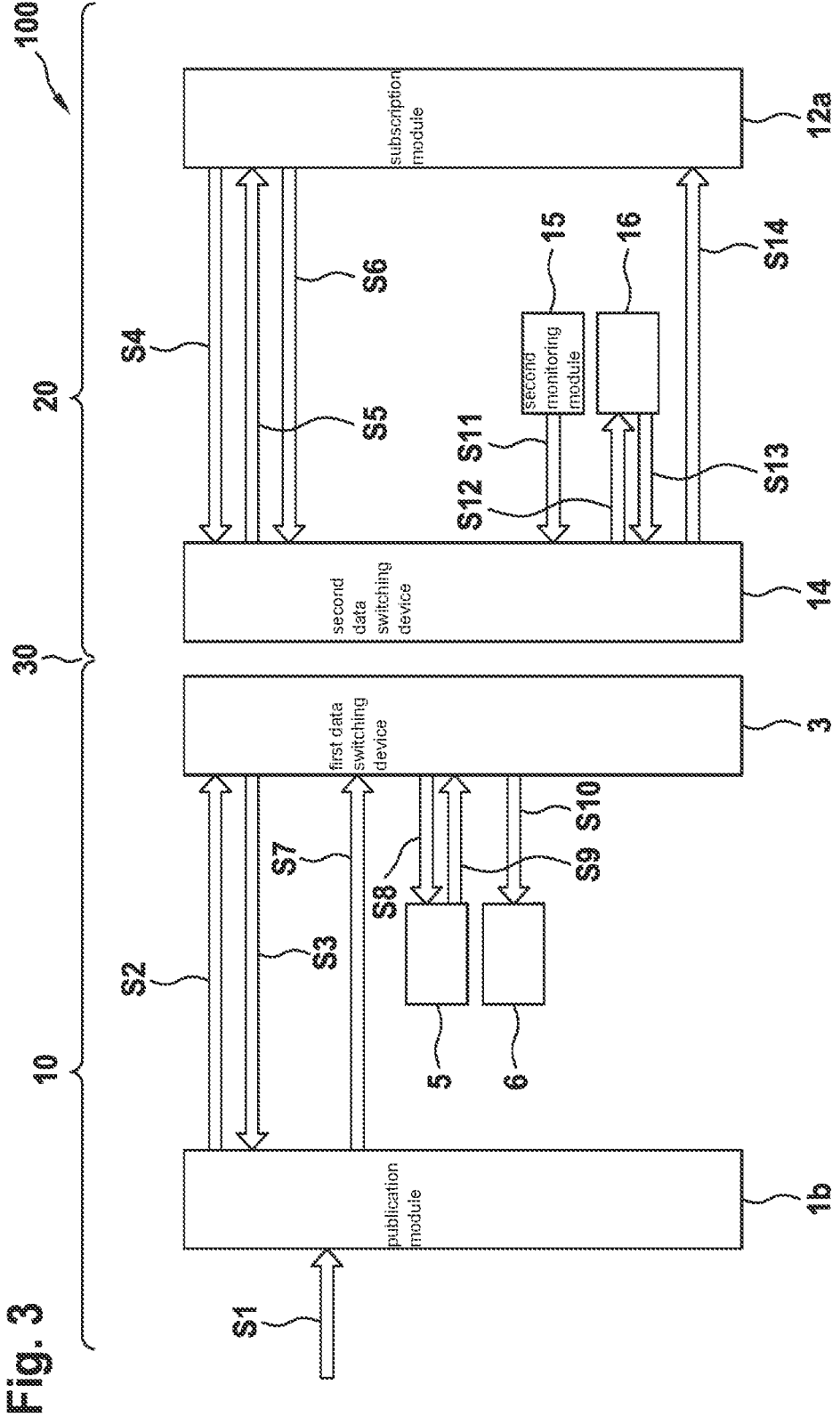
FIG. 3 illustrates a transmission of data, according to an example embodiment of the present invention.

FIG. 3 shows data packet preparation up to security integrity checking and the handshakes required for this between individual components of the backend device 10 and the apparatus device 20.

It can be seen that, inside the backend device 10, data on captured objects $O_1 \ldots O_n$ are transferred to a publication module 1b of the control device 1 in a step S1. In a step S2, a connection to a first data switching device 3 of the backend device 10 is established, the establishment thereof being confirmed in a step S3. In a step S4, a connection is established on the apparatus device 20 between a subscription module 12a of the capturing device 12 and a second data switching device 14 on the apparatus device 20, this being confirmed in a step S5 once complete. In a step S6, the subscription module 12a logs in for desired data related to objects $O_1 \ldots O_n$.

Steps S1 to S6 can be carried out once or even multiple times at defined points in time on the backend device 10 and on the apparatus device 20, as applicable.

In a step S7, new data related to objects $O_1 \ldots O_n$ captured by sensors in the environment around the at least partially automated apparatus are supplied or published to the first data switching device 3. In a step S8, the first data switching device 3 issues an instruction for signing said data, and the signed data are transferred to the first data switching device 3. In a step S10, the first data switching device 3 gives a first communication module 2b a command to transmit the signed messages via the air interface 30. In a step S11 carried out on the apparatus device 20, the received data related to the objects $O_1 \ldots O_n$ are confirmed. In a step S12, the security information of the data is checked and, in a step S13, is confirmed to the second data switching device 14, which then transfers the received and checked data to the subscription module 12a in a step S14. Consequently, FIG. 3 illustrates a structuring of the data flow between the backend device 10 and the apparatus device 20 via the air interface 30.

In this case, the backend device 10 may have, for example, sensors and/or algorithms that are not available on the apparatus device 20 or cannot be executed thereon (e.g., due to a lack of computing power).

Figure 4:
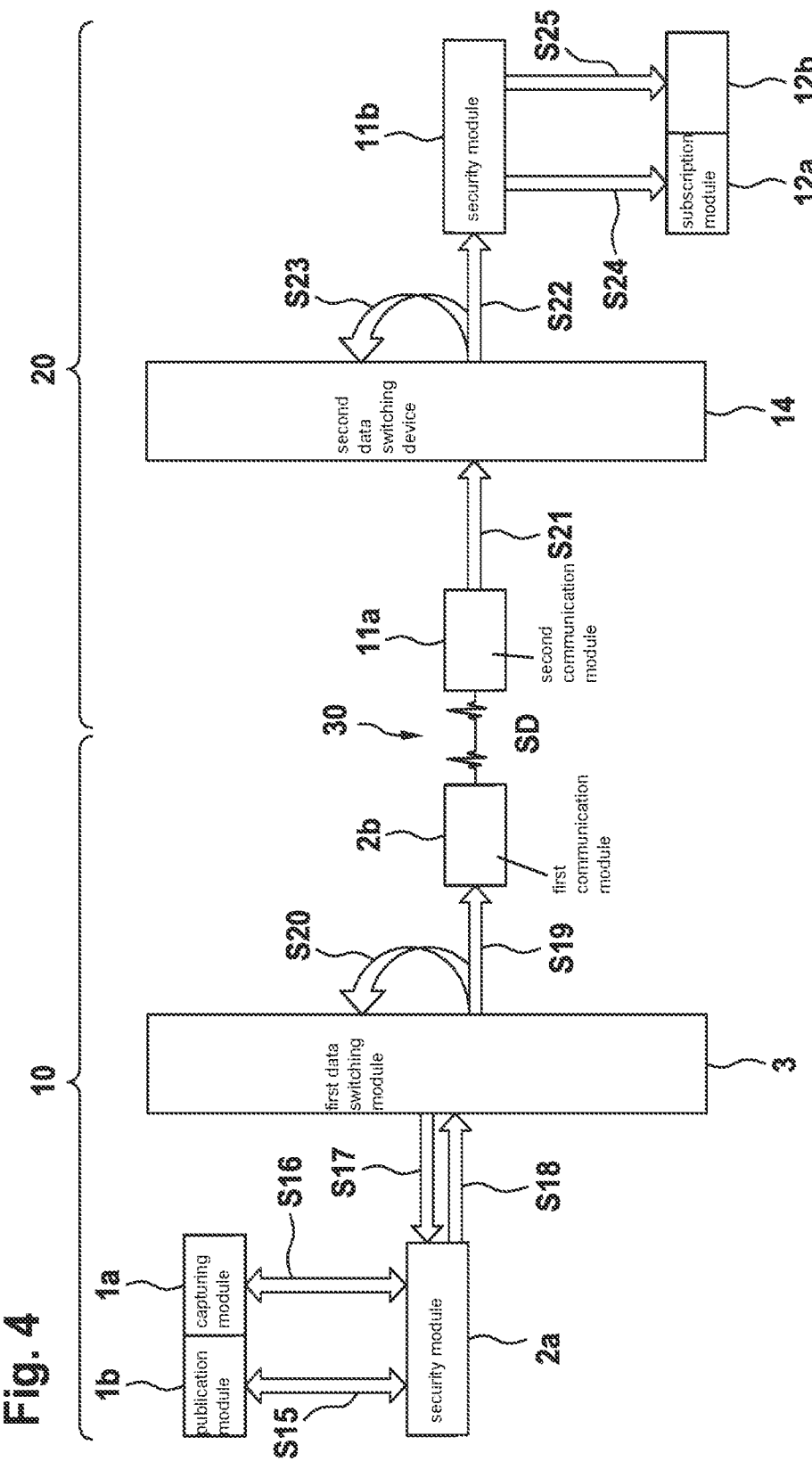
FIG. 4 illustrates a transmission of monitoring data, according to an example embodiment of the present invention.

FIG. 4 shows the independent monitoring of the data flow by way of the monitoring data SD. In steps S15 and S16, a check on a security status of the monitoring data SD is carried out between the capturing module 1*a* and the publication module 1*b* of the backend device 10. In a step S17, the security module 2*a* checks the master security certificate assigned by the backend device 10 for the payload data D, this being confirmed to the first data switching device 3 in a step S18.

In a step S19, the monitoring data SD are transferred via the air interface 30 using a first communication module 2*b*. In a step S20, cyclical checks are carried out as to whether the monitoring data SD are available at the first data switching device 3.

In a step S21, the monitoring data SD received by a second communication module 11*a* of the receiving device 11 of the apparatus device 20 are relayed to the second data switching device 14. In a step S22, the received monitoring data SD are relayed to the security module 11*b* of the receiving device 11 of the apparatus device 20. In cyclically carried out steps S23, it is checked whether the monitoring data SD arrived at the second data switching device 14 at expected times.

In steps S24 and S25, it is confirmed that the data communication via the air interface 30 is secure for a defined time period (e.g., for n milliseconds).

Consequently, FIG. 4 illustrates a transmission of the monitoring data SD between the backend device 10 and the apparatus device 20, this transmission being used to check whether the air interface 30 is functional.

The monitoring data SD are preferably generated cyclically and are transmitted via the air interface 30, as a result of which the apparatus device 20 always knows when the next data packet of monitoring data SD has to arrive.

Figure 5:
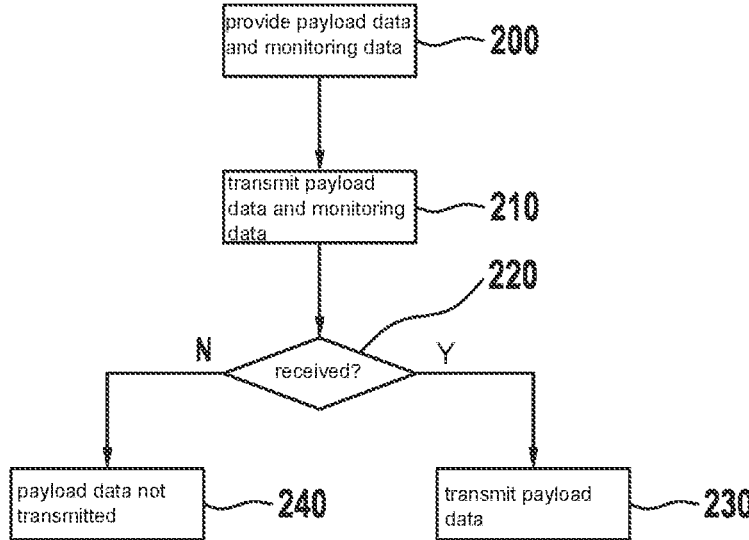
FIG. 5 shows a schematic sequence of a method for operating a security system, according to an example embodiment of the present invention.

FIG. 5 shows a schematic sequence of a proposed method.

In a step 200, payload data D and monitoring data SD are provided on a backend device 10.

In a step 210, the payload data D are transmitted via a first channel and the monitoring data SD are transmitted via a second channel of an air interface 30 to an apparatus device 20.

In a step 220, it is checked whether the monitoring data SD have been received at expected times.

If this is the case, the payload data D are transmitted to the apparatus device 20 in a step 230.

If this is not the case, in a step 240 the payload data D are not transmitted to the apparatus device 20, in which case the apparatus controlled using the apparatus device 20 is, for example, placed in a safe state.

Advantageously, the proposed method can be used, for example, in automated vehicle parking and/or when operating an automated vehicle in an urban setting. Externally controlled operation of the at least partially automated vehicle at a higher speed is possible, for example. Applications for operating at least partially automated manufacturing machines in an industrial setting, for example real-time manufacturing robots, are also possible.

Advantageously, the proposed method can be implemented in the form of a software program that has suitable program code means and is run on a security system having the above-described components. This makes the method simple to adapt.

Advantageously, the proposed method can be used, for example, in automated vehicle parking and/or when driving a vehicle in an at least partially automated manner in an urban setting.

A person skilled in the art would modify and/or combine the features of the present invention in a suitable manner without departing from the core concept of the present invention. For example, the number of channels of the security system may also be greater than two. The number of channels may also be one if the data flow monitoring and control flow monitoring and the other security mechanisms are embedded in a shared container including the payload.

What is claimed is:

1. A method for operating a security system, comprising the following steps performed by a backend device:
   providing payload data and monitoring data on a backend device; and
   transmitting the payload data via a first channel to an apparatus device and transmitting the monitoring data via a second channel of an air interface to an apparatus device;
   wherein the payload data are transmitted to the apparatus device only when the monitoring data are cyclically received on the apparatus device,
   wherein receipt of the monitoring data is cyclically checked by the apparatus device, wherein the apparatus device knows points in time at which the monitoring data are supposed to be received, and wherein the apparatus device transmits the payload data only upon verifying receipt of the monitoring data at the points in time.

2. The method as recited in claim 1, wherein the payload data are supplied to a publication module of the backend device.

3. The method as recited in claim 1, wherein the payload data and the monitoring data are encrypted on the backend device and transmitted over an air interface in an encrypted manner.

4. The method as recited in claim 1, wherein the payload data are received by a data switching device on the apparatus device and are distributed to registered components of the apparatus device.

5. The method as recited in claim 1, wherein, in the event that the monitoring data are not received by the apparatus device, an apparatus operated using the apparatus device is placed in a safe state or a function implemented on based on the payload data is adjusted such that the apparatus can continue to be safely operated.

6. A backend device, comprising:
   a hardware control device;
   a sending device;
   a first data switching device; and
   a first monitoring module;
   wherein payload data and monitoring data can be transmitted on independent channels of a radio interface using the first data switching device and the first monitoring module,
   wherein the monitoring data can be transmitted cyclically by the backend device, and
   wherein the payload data is transmitted only upon verifying receipt of the monitoring data at known points in time at which the monitoring data are supposed to be received.

7. An apparatus device, comprising:
   a receiving device;
   a capturing device;
   a hardware control device;

a second data switching device; and a second monitoring module;

wherein payload data and monitoring data can be received in a timely and punctual manner on independent channels of a radio interface using the second data switching device and the second monitoring module, wherein receipt of the monitoring data is cyclically checked by the apparatus device, wherein the apparatus device knows points in time at which the monitoring data are supposed to be received, and wherein the apparatus device transmits the payload data only upon verifying receipt of the monitoring data at the points in time.

8. A security system, comprising:

a backend device including:

a hardware control device, a sending device, a first data switching device, and a first monitoring module, wherein payload data and monitoring data can be transmitted on independent channels of a radio interface using the first data switching device and the first monitoring module; and an apparatus device, including:

a receiving device, a capturing device, a second hardware control device, a second data switching device, and a second monitoring module, wherein the payload data and the monitoring data can be received by the apparatus device from the backend apparatus on the independent channels of the radio interface using the second data switching device and the second monitoring module; and the radio interface, the radio interface being arranged between the backend device and the apparatus device, wherein data transmission from the backend device to the apparatus device via the radio interface is monitored, wherein receipt of the monitoring data is cyclically checked by the apparatus device, wherein the apparatus device knows points in time at which the monitoring data are supposed to be received, and wherein the apparatus device transmits the payload data only upon verifying receipt of the monitoring data at the points in time.

9. A non-transitory computer-readable data medium which is stored a computer program including program code for operating a security system, the program code, when executed by a security system, causing the security system to perform the following steps:

providing payload data and monitoring data on a backend device; and transmitting the payload data via a first channel to an apparatus device and transmitting the monitoring data via a second channel of an air interface to an apparatus device;

wherein the payload data are transmitted to the apparatus device only when the monitoring data are cyclically received on the apparatus device, wherein receipt of the monitoring data is cyclically checked by the apparatus device, wherein the apparatus device knows points in time at which the monitoring data are supposed to be received, and wherein the apparatus device transmits the payload data only upon verifying receipt of the monitoring data at the points in time.

\*   \*   \*   \*   \*